Nov. 15, 1932.  W. E. SMITH  1,887,878

SHAFT OPERATING AND LOCKING APPARATUS

Filed April 9, 1932

INVENTOR
William E. Smith.
BY
HIS ATTORNEY

Patented Nov. 15, 1932

1,887,878

UNITED STATES PATENT OFFICE

WILLIAM E. SMITH, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

SHAFT OPERATING AND LOCKING APPARATUS

Application filed April 9, 1932. Serial No. 604,157.

My invention relates to shaft operating and locking apparatus, and particularly to apparatus of the type involving a shaft and a removable hand lever for operating the shaft.

One feature of my invention is the provision of means for locking the shaft in one of a number of definite angular positions, except when the hand lever is applied to the shaft. Another feature of my invention is the provision of means for preventing the removal of the hand lever from the shaft unless the shaft occupies one of such definite angular positions.

I will describe one form of apparatus embodying my invention, and will then point out the novel features thereof in claims.

Figure 1:
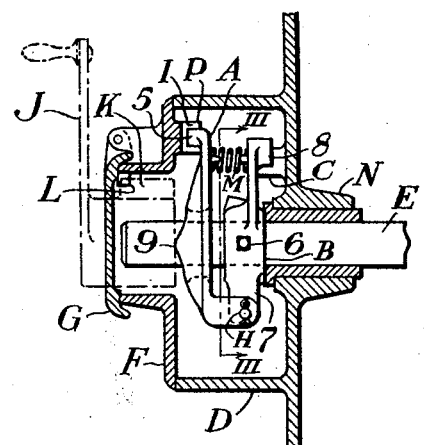
Figure 2:
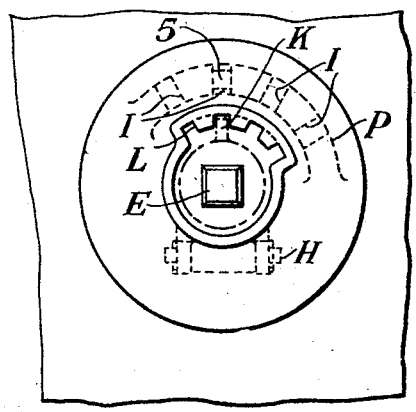
Figure 3:
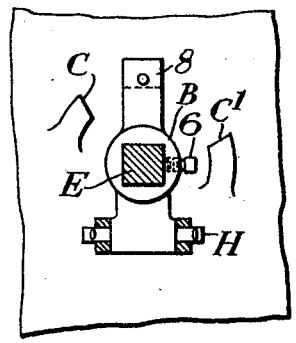
Figure 4:
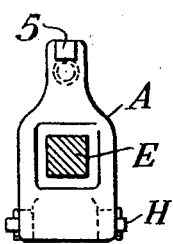

In the accompanying drawing, Fig. 1 is a transverse sectional view showing one form of apparatus embodying my invention. Fig. 2 is an end view of the apparatus shown in Fig. 1 with the cover G removed. Fig. 3 is a sectional view on the line III—III of Fig. 1. Fig. 4 is a front view of a locking member A forming part of the apparatus shown in Fig. 1.

Similar reference characters refer to similar parts in each of the views.

Referring to the drawing, the reference character E designates a shaft which is mounted for angular motion around its longitudinal axis. One bearing for the support of this shaft is designated N, but the other bearing or bearings are omitted from the drawing. The shaft extends through the bearing N and terminates in a free end which is square and which is adapted to receive a hand crank J. The free end of the shaft E is partially enclosed in a housing D which is made up in part of an apertured plate F. The aperture in this plate may be provided with a cover G to protect the end of the shaft E and the apparatus enclosed within the housing, the cover being pivotally mounted or otherwise arranged for removal when the hand crank J is to be applied to the shaft.

Fixed to the shaft E within the housing D is a collar B having two diametrically opposite arms 7 and 8. As here shown, the collar is attached to the shaft by a set screw 6.

The reference character A designates a locking member which is pivotally mounted at H in the arm 7 of collar B. This member A is provided with an aperture to receive the shaft E with considerable clearance, and terminates in a free end which registers with the arm 8 of the collar B. Interposed between the arm 8 and the free end of member A is a spring M which normally biases the arm A away from the arm 8.

The free end of the member A is provided with a dog 5, and this dog is adapted to project into any one of a plurality of notches I formed in a boss P, which projects inwardly from the outside face of the plate F. As shown in Fig. 2, this boss P is radial with respect to the center of oscillation of the shaft E, and, as here shown, there are four equally spaced notches I, corresponding to four definite angular positions which it is desired that the shaft E shall assume. When the shaft E occupies any one of these positions and the hand crank J is not applied, the spring M presses the dog 5 of locking member A into the corresponding notch, and the shaft is then locked in such position.

When the hand crank J is applied to the free end of the shaft E, the hub of this crank engages a pair of projections 9 on the locking member A, thereby swinging this member inwardly, against the action of the spring M, to such position that the dog 5 is released from the notch I which it previously occupied. The shaft E is then free to be moved angularly by suitable operation of the crank J.

The hub of the crank J is provided with a radial lug K, which cooperates with a plurality of lugs L which project inwardly from the plate F. These parts are so arranged that when the shaft E occupies any one of its definited angular positions, the hand crank J can be inserted into and removed from its operating position on the shaft without interference by the lugs L, but that when the crank is in operating position and the shaft is not in one of its definite positions, the lug K will be behind one of the lugs L and the crank can not then be removed from the shaft.

The angular motion of the shaft E may be limited by two fixed stops C and C¹ integral with the back plate of housing D and arranged to coact with arm 8, as shown in Fig. 3.

The shaft E may be used to operate any desired apparatus or device, such, for example, as a railway signal semaphore intended for hand operation only.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination, a shaft mounted to oscillate and having a free end, a hand crank arranged to coact with the free end of said shaft, a fixed housing partially enclosing the free end of said shaft, a collar fixed to said shaft and having diametrically opposite arms, a locking dog located between said collar and the free end of the shaft and pivotally attached to one of said arms and extending across the shaft and terminating in a free end which faces the other of said arms, said housing having notches adapted to receive the free end of said dog when the dog is swung outwardly from the collar, a spring interposed between the free end of said dog and the said other arm of said collar to bias the dog into any one of said notches with which it may be in alignment, said dog being positioned for engagement with the hub of the hand crank so that when the crank is applied to the shaft the dog is swung inwardly against the action of said spring and so is released from whatever notch it previously occupied.

2. In combination, a shaft mounted to oscillate and having a free end, a hand crank arranged to coact with the free end of said shaft, a fixed housing partially enclosing the free end of said shaft, a collar fixed to said shaft and having diametrically opposite arms, a locking dog located between said collar and the free end of the shaft and pivotally attached to one of said arms and extending across the shaft and terminating in a free end which faces the other of said arms, said housing having notches adapted to receive the free end of said dog when the dog is swung outwardly from the collar, a spring interposed between the free end of said dog and the said other arm of said collar to bias the dog into any one of said notches with which it may be in alignment, said dog being positioned for engagement with the hub of the hand crank so that when the crank is applied to the shaft the dog is swung inwardly against the action of said spring and so is released from whatever notch it previously occupied, and cooperating means involving said crank and said housing for preventing removal of the crank from the shaft unless the shaft is in such position that the dog is in alignment with one of said notches.

3. In combination, a shaft mounted to oscillate and having a free end, a hand crank arranged to coact with the free end of said shaft, a fixed housing partially enclosing the free end of said shaft, a collar fixed to said shaft and having diametrically opposite arms, a locking dog located between said collar and the free end of the shaft and pivotally attached to one of said arms and extending across the shaft and terminating in a free end which faces the other of said arms, said housing having notches adapted to receive the free end of said dog when the dog is swung outwardly from the collar, a spring interposed between the free end of said dog and the said other arm of said collar to bias the dog into any one of said notches with which it may be in alignment, said dog being positioned for engagement with the hub of the hand crank so that when the crank is applied to the shaft the dog is swung inwardly against the action of said spring and so is released from whatever notch it previously occupied, the hub of the hand crank having a radial lug, and lugs projecting radially inward from said housing and cooperating with said hand crank lug to prevent removal of the crank from the shaft unless the shaft is in such position that said locking dog is in alignment with one of its notches.

In testimony whereof I affix my signature.

WILLIAM E. SMITH.